(12) United States Patent
Toth et al.

(10) Patent No.: US 8,556,270 B2
(45) Date of Patent: Oct. 15, 2013

(54) RADIAL SHAFT SEAL, RADIAL SHAFT SEAL ASSEMBLY AND METHOD OF INSTALLATION

(75) Inventors: David M. Toth, Brighton, MI (US); Brent R. Sedlar, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 85 days.

(21) Appl. No.: 13/162,646

(22) Filed: Jun. 17, 2011

(65) Prior Publication Data

US 2012/0319358 A1 Dec. 20, 2012

(51) Int. Cl.
*F16J 15/32* (2006.01)

(52) U.S. Cl.
USPC .......................................... 277/551; 277/559

(58) Field of Classification Search
USPC ......... 277/549, 551, 553, 558, 562, 576, 577, 277/559, 561, 572
See application file for complete search history.

(56) References Cited

U.S. PATENT DOCUMENTS

| | | | | |
|---|---|---|---|---|
| 3,746,351 | A | * | 7/1973 | Tucker, Jr. ..................... 277/575 |
| 4,426,094 | A | * | 1/1984 | Antonini ....................... 277/565 |
| 4,491,332 | A | | 1/1985 | Zumbusch |
| 4,575,104 | A | * | 3/1986 | Nagasawa et al. ............ 277/551 |
| 5,083,802 | A | * | 1/1992 | Shimasaki et al. ............ 277/560 |
| 5,385,351 | A | * | 1/1995 | White ........................... 277/572 |
| 5,398,942 | A | | 3/1995 | Duckwall et al. |
| 6,814,356 | B2 | | 11/2004 | Esumi |
| 6,896,270 | B1 | * | 5/2005 | Sturman et al. ............... 277/572 |
| 7,344,140 | B2 | * | 3/2008 | Ikeda ............................ 277/572 |
| 7,959,157 | B2 | * | 6/2011 | Dobbs et al. .................. 277/551 |
| 8,096,559 | B2 | * | 1/2012 | Cook ............................ 277/353 |
| 2008/0217865 | A1 | | 9/2008 | Sedlar | |

FOREIGN PATENT DOCUMENTS

| | | |
|---|---|---|
| EP | 0611904 A1 | 8/1994 |
| EP | 1933068 A2 | 6/2008 |
| JP | 54-112440 | 2/1978 |
| JP | 2003269616 A | 9/2003 |

OTHER PUBLICATIONS

International Search report PCT/US2012/042168 mailed on Sep. 25, 2012.

* cited by examiner

*Primary Examiner* — Vishal Patel
*Assistant Examiner* — Stacy Warren
(74) *Attorney, Agent, or Firm* — Robert L. Stearns; Dickinson Wright, PLLC

(57) ABSTRACT

A radial shaft seal configured for receipt in a housing and about a shaft to sealingly isolate an air side of the seal from an oil side of the shaft seal is provided. The seal includes a mounting portion and a seal lip having an annular sealing surface extending between an oil side end and a free air side end. An annular bridge is connected to the oil side end of the seal lip by a first hinge and to the mounting portion by a second hinge. The bridge extends from the first hinge to the second hinge in radially overlying relation to the seal lip. An annular projection extends from the mounting portion axially away from the bridge. The projection has an oil side facing the seal lip and confronts the air side end of the seal lip upon the seal lip pivoting about the first hinge.

7 Claims, 3 Drawing Sheets

RADIAL SHAFT SEAL, RADIAL SHAFT SEAL ASSEMBLY AND METHOD OF INSTALLATION

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil side" of the seal and an "air side." These designations pertain to the orientation of the seal when installed, with the oil side facing the interior of the housing and in communication with the oil, whereas the air side faces outwardly and is exposed to the air.

There are at least two different ways in which a radial shaft oil seal can be installed. An "air side installation" is one in which the seal is first installed into the bore of the housing and the shaft (or its wear sleeve) thereafter installed from the air side axially into the seal assembly (in the direction inward of the housing) to effect the seal. An "oil side installation" is the other where the housing and shaft are already present and the seal assembly is slid axially into the housing and simultaneously onto the shaft (or its wear sleeve), such that the shaft enters the seal assembly from the oil side of the seal. Otherwise, the seal assembly is installed into the housing and then the shaft is inserted through the seal from an "oil-side" of the seal.

During installation, regardless of the type, the seals must be able to withstand the axial loads resulting during installation without causing a seal lip of the seal to reverse fold or otherwise become displaced to a position where the seal lip is ineffective in the fully installed condition. In addition, during installation, the seal assembly must be installed with the seal lip oriented in concentric relation to the running surface on the shaft. Otherwise, the integrity of the seal formed between the seal lip will be compromised.

Radial shaft seals are also subject to varying axial pressures that can be seen during leak testing or in use. The pressure differential developed across the seal (between the oil and air side of the seal) can impart an axial load on the seal in one direction or the other (a vacuum or increased pressure in the housing) and can cause the seal to pull away from the shaft to at least some degree, and in extreme cases can cause the seal to reverse fold and collapse under the pressure so that the seal is broken.

SUMMARY OF THE INVENTION

In general terms, this invention provides a radial shaft seal assembly having features that facilitate making a proper oil side installation, even in conditions of shaft-to-bore misalignment, and further, provide support for a seal lip of the seal assembly against adverse seal-breaking movement when exposed to positive or negative pressure on an oil side of the seal assembly when installed.

In accordance with one presently preferred aspect of the invention, a radial shaft seal configured for receipt in a housing and about a shaft to sealingly isolate an air side of the shaft seal from an oil side of the shaft seal is provided. The radial shaft seal includes an annular mounting portion and a seal lip having an annular sealing surface extending between an oil side end and a free air side end, with the sealing surface being configured to extend axially relative to the shaft. Further, an annular bridge is connected to the oil side end of the seal lip by a first hinge and to the mounting portion by a second hinge. The bridge extends from the first hinge to the second hinge in radially overlying relation to the seal lip. At least one projection extends from the first hinge away from the bridge toward the oil side of the seal. The projection prevents the seal lip from inverting during the oil-side installation process, thereby ensuring that the seal lip attains its proper sealing contact with a running surface during use.

In accordance with another aspect of the invention, a radial shaft seal assembly is provided. The radial shaft seal assembly includes a shaft extending along a central axis and providing a running surface with a predetermined diameter and a radial shaft seal configured for receipt in a housing and about the shaft to sealingly isolate an air side of the radial shaft seal from an oil side of the radial shaft seal. The radial shaft seal includes an annular mounting portion and a seal lip having an annular sealing surface and an opposite backing surface extending between an oil side end and a free air side end, with the sealing surface being configured to extend axially in dynamic sealing contact with the running surface. Further, an annular bridge is attached to the oil side end of the seal lip by a first hinge and to the mounting portion by a second hinge. The bridge extends from the first hinge to the second hinge in radially overlying relation to the seal lip. In addition, at least one projection extends axially from the first hinge toward the oil side of the seal.

In accordance with another aspect of the invention, a method of installing a radial shaft seal onto a shaft is provided. The method includes providing a shaft having a running surface and providing the radial shaft seal with a seal lip having an annular sealing surface converging from an oil side end to a free air side end while in a free state. Further, providing the radial shaft seal with an annular bridge attached to the oil side end by a first hinge with the bridge diverging to a second hinge while in the free state. The second hinge being attached to an outer mounting portion such that the bridge extends in radially overlying relation with the seal lip. The radial shaft seal further including at least one projection extending axially from the first hinge toward an oil side of the seal. Then, moving the shaft and the radial shaft seal axially toward one another and bringing the oil side end of the seal lip into abutment with an end of the shaft. Further, bringing the projection into abutment with running surface of the shaft and bringing the sealing surface into sealing engagement with the running surface while simultaneously moving the projection out of abutment with the running surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
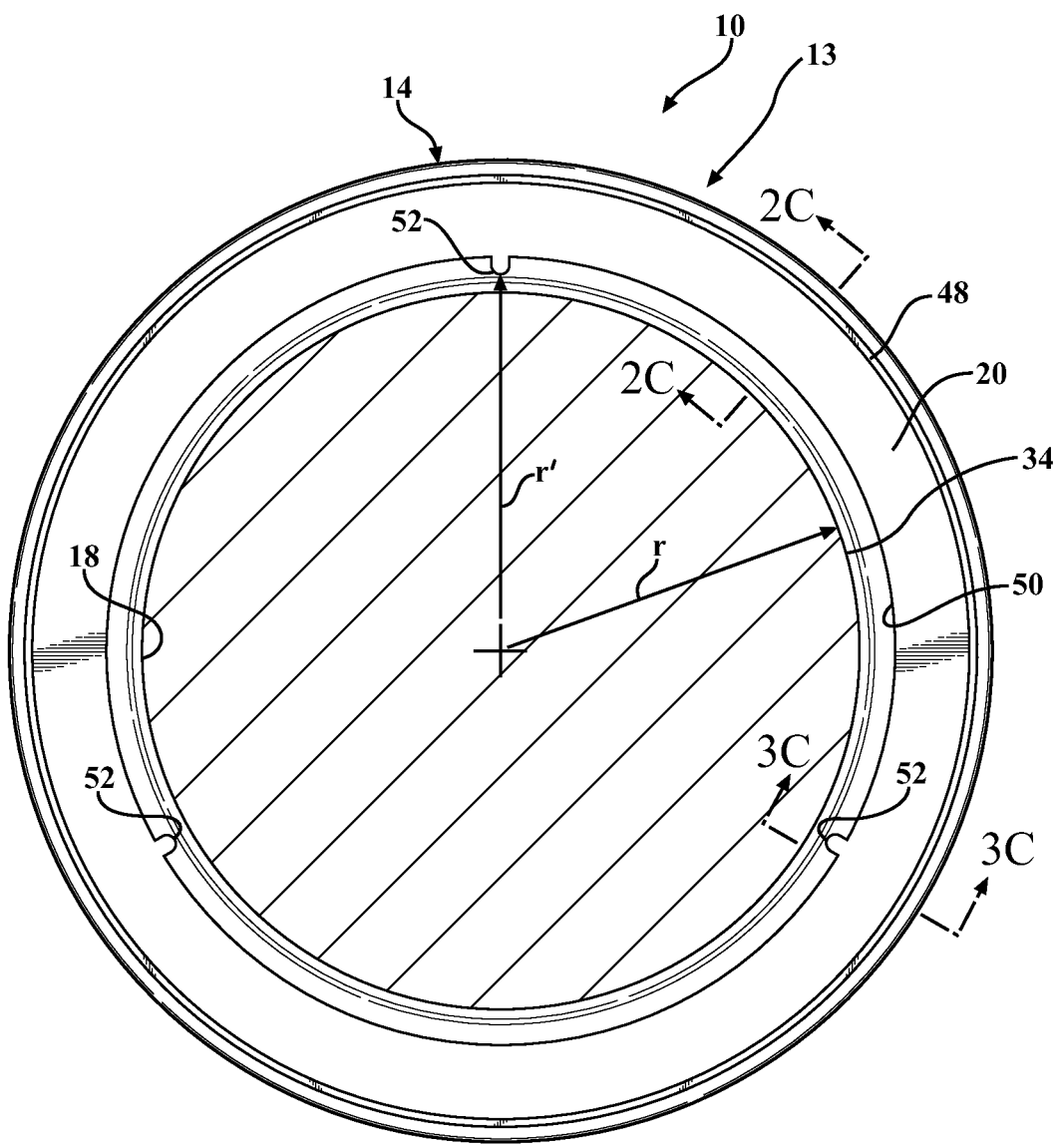
FIG. 1 is a front view of a radial shaft seal constructed according to one aspect of the invention with the seal shown disposed on a shaft.

Referring in more detail to the drawings, FIG. 1 illustrates a radial shaft seal, referred to hereafter as seal 10, constructed in accordance with one aspect of the invention, wherein the seal is suitable for use in a crankcase application, by way of example and without limitation, for sealing about a rotatable shaft 12 in a radial shaft seal assembly 13. The seal 10 has an oil-side O and an axially opposite air-side A, in relation to the orientation of the seal 10 when installed, with the oil-side O facing the interior of the application being sealed and the air-side A facing the outside environment of the application being sealed. The seal 10 includes a mounting portion, such as an outer case, also referred to as collar 14, provided as a metal or polymeric annulus or ring structure 15 with an elastomeric seal material 16 attached thereto. The elastomeric material 16 forms a seal body 17 and extends radially inwardly to provide a seal lip 18. Further, an annular rigid debris exclusion, anti-inversion disc, referred to hereafter as disc 20, is fixed to the seal body 17 and/or the collar 14 on the air-side A of the seal body 17. The disc 20 is planar or substantially planar and extends radially inwardly from the collar 14 in axially spaced relation from the seal lip 18 to form a shield, also referred to as barrier to exclude debris from impacting the seal lip 18. As such, the seal lip 18 is protected against possible damage from debris and debris is inhibited from reaching the oil-side O of the seal 10. Further, the disc 20 acts to facilitate proper installation of the seal 10, both by facilitating radial alignment of the seal lip 18 about the shaft 12 and by preventing the seal lip 18 from inverting during installation over the shaft 12.

The metal or polymeric collar 14 may be L-shaped, or may take on any number of configurations, such as C-shaped, S-shaped, or ring shaped, as shown, depending upon the requirements of a particular application, as is known in the art. The metal reinforcing ring structure 15 is shown covered at least in part with the elastomeric seal material 16 on an outer surface which may be contoured with undulations 22 to provide a snug and fluid tight installation in the bore of the crankcase (not shown).

Figure 2A:
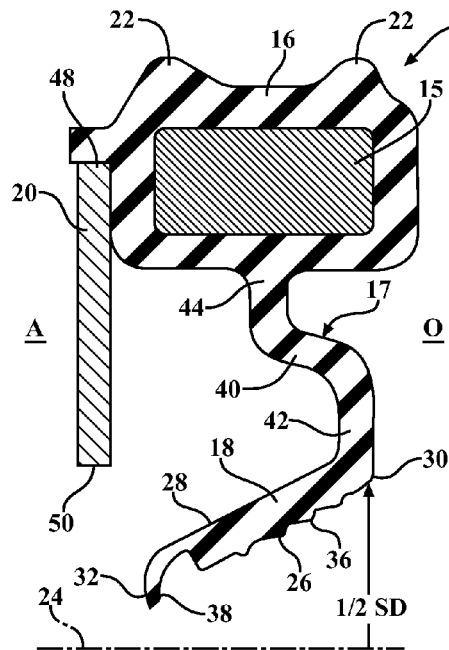
FIG. 2A is cross-sectional view of the seal of FIG. 1 shown in a free, unassembled state.
Figure 3A:
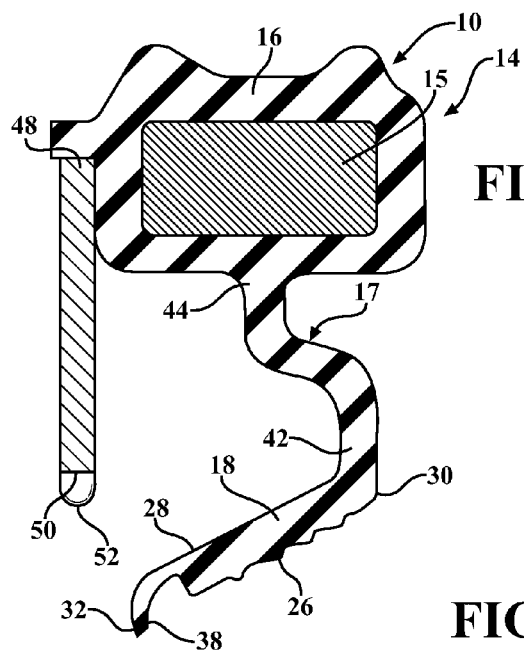
FIG. 3A is a view similar to FIG. 2A taken along a different location showing a radially inwardly extending alignment projection feature on a debris exclusion, anti-inversion disc of the seal.

The seal lip 18, when in the relaxed, uninstalled state (FIGS. 2A and 3A), extends slightly angled by a few degrees, such as between about 1-10 degrees from a horizontal central axis 24 of the seal 10 and has an annular, radially inwardly facing, inner sealing surface 26 and an opposite, radially outwardly facing, outer backing surface 28 extending between an oil-side end 30 and a free air-side end 32. The sealing surface 26, while in its free state, has a maximum inner diameter SD (2×1/2 SD) at the oil-side end 30 that is less than an outer diameter OD (2×r) of a running surface 34 of the shaft 12, and thus, the entire inner sealing surface 26 is assured of being brought into sealed engagement with the running surface 34 in use. The sealing surface 26 can be configured having hydrodynamic features 36 in the form of ribs or a thread that act to pump oil back to the oil-side O of the seal during rotation of the shaft. Further, the air-side end 32 can be provided in the form of a dust exclusion lip 38, by way of example and without limitation, that facilitates prevention of contamination ingress from the air-side A to the oil-side O of the seal assembly 10, and further, facilitates maintaining the lubricant on the oil-side O of the seal assembly 10.

An annular bridge 40 operably connects the seal lip 18 to the seal body 17. The annular bridge 40 is connected to the oil side end 30 of the seal lip 18 by a first hinge 42 and to the seal body 17 by a second hinge 44. The bridge 40 extends radially outwardly generally transversely from the seal lip 18 and then back over the seal lip 18 in overlying fashion at an angle to the horizontal central axis 24, such as between about 20-40 degrees, though the angle can range from 1-89 degrees from horizontal. Thus, the bridge 40 provides an annular pocket 46 facing the air-side A of the seal assembly 10.

The rigid disc 20 has an outermost annular periphery 48 and an innermost annular periphery 50 spaced axially from the air-side end 32 of the seal lip 18. The disc 20 is fixed against relative movement to the collar 14 and seal body 17, such as by being mechanically fixed to the collar 14, such as via crimping, for example, and/or to the seal body 17, such as via an adhesive, for example. It should be recognized that the adhesive could be applied between the abutting surface of the disc 20 and the seal body 17, and that the collar 14 can be brought into locked engagement with the outermost periphery 48 via spin forming and/or staking processes. As best shown in FIG. 1, the disc 20 has a plurality of radially inwardly extending shaft/seal lip alignment features, referred to hereafter as projections 52. The projections 52 are shown spaced circumferentially equidistant from one another, shown as being 120 degrees from one another, though more projections could be included, if desired. As shown in FIG. 1, the projections 52 have free tips that define an inner diameter ID (2×r'), wherein the ID is slightly larger than the OD (2×r) of the shaft running surface 34, as shown in FIG. 3C. Accordingly, upon completing installation of the shaft 12 through the seal 10, the projections 52 remain out of contact with the shaft running surface 34. However, during installation of the shaft 12 through the seal 10, the projections 52 facilitate proper concentric alignment of the seal lip 18 against the shaft running surface 34 to perfect the desired seal between the seal lip 18 and the running surface 34. Accordingly, the disc 20 ensures the seal lip 18 is both prevented from inadvertent inversion and properly configured in sealed arrangement during and upon completion of insertion of the shaft 12 through the seal 10.

Figure 2B:
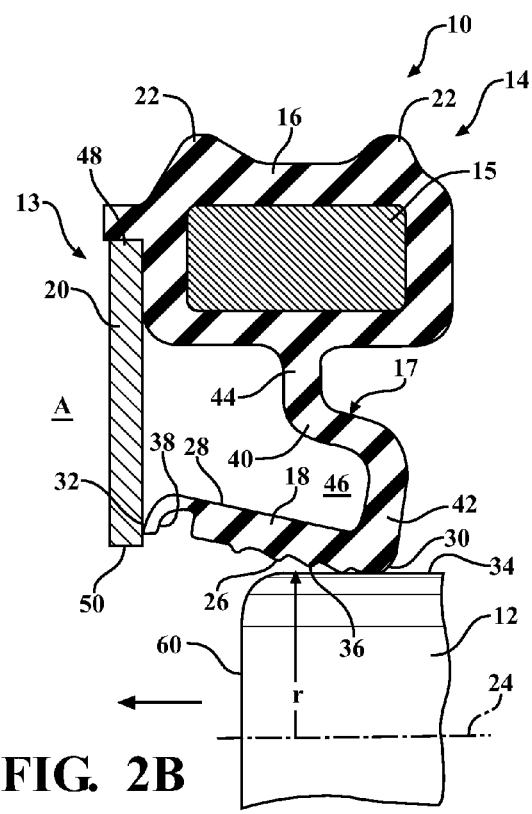
FIG. 2B is a view of the seal of FIG. 1 shown being initially disposed on a shaft.
Figure 2C:
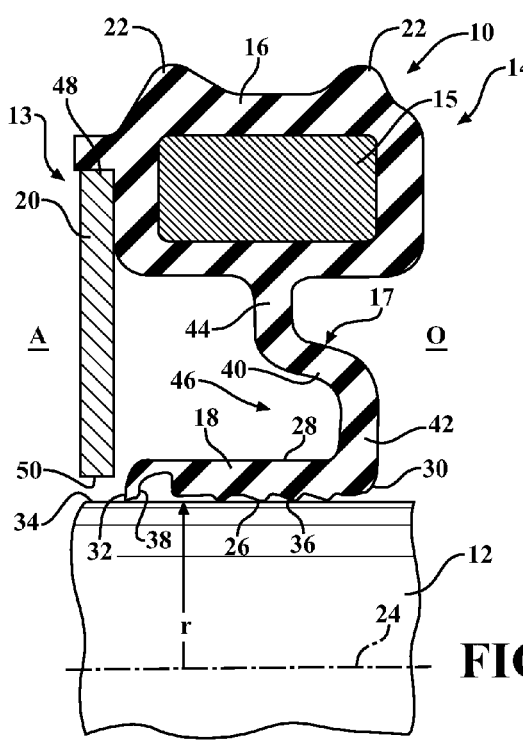
FIG. 2C is a view taken generally along the line 2C-2C of FIG. 1 showing the seal being fully disposed on a shaft.
Figure 3B:
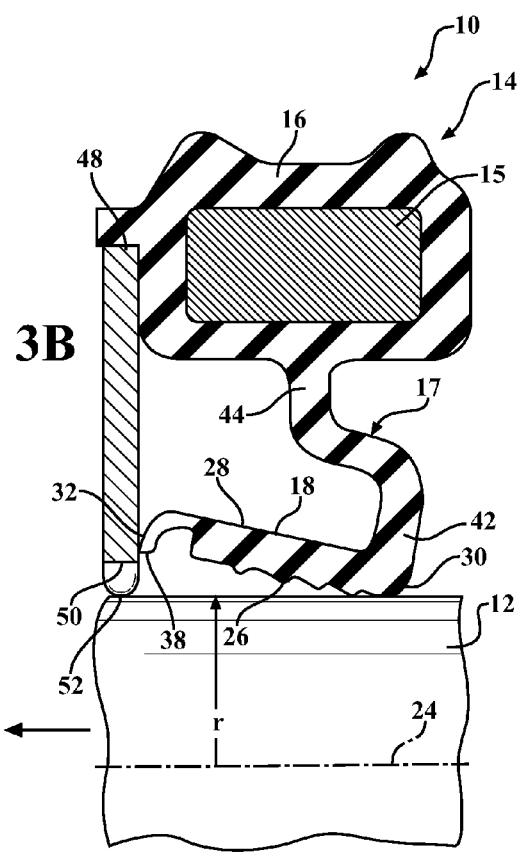
FIG. 3B is a view similar to FIG. 2B showing the seal being initially disposed on a shaft.
Figure 3C:
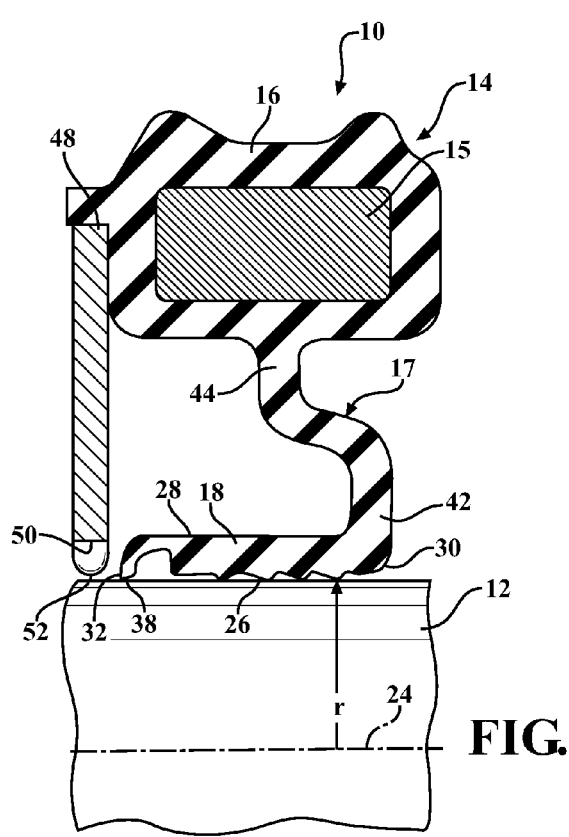
FIG. 3C is a view taken generally along the line 3C-3C of FIG. 1 showing the seal being fully disposed on a shaft.

FIGS. 2B and 3B illustrate an oil-side installation progression of the shaft 12 through the seal 10. During installation, the seal 10 is already installed into a housing, with the shaft 12 thereafter being extended through the seal 10 from the oil-side O toward the air-side A, or the housing, with the seal 10 fixed thereto, is assembled over the shaft 12 such that the shaft 12 extends through the oil-side of the seal outwardly through the air-side of the seal 10. As the shaft 12 is slid axially through the seal 10, an end 60 of the shaft 12 initially engages the oil side end 30 of the seal 10 and, as this is occurring, the main seal lip 18 is caused to expand radially outwardly and the air-side end 32 of the seal lip 24 is caused to pitch radially outwardly, such that the pocket 46 is caused to partially collapse, thereby reducing the axial installation force required to install the seal 10 about the shaft 12. As the installation progresses, the air-side end 32 continues to move radially outwardly and axially toward the air-side A of the seal 10. As a result, the air-side end 32 confronts and is caused to impact the disc 20 such that the disc 20 prevents the seal lip 18 from continuing to move axially toward the air-side A of the seal 10. Accordingly, the disc 20 prevents the seal lip 18 and the bridge 40 from being rolled and inverted axially outwardly toward the air-side A of the seal 10. As such, as shown in FIGS. 2C and 3C, upon full installation of the shaft 12 through the seal 10, the seal lip 18 is able to automatically return radially inwardly and axially away from the disc 20 to attain its proper sealing configuration with the running surface 34 of the shaft 12.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air-side of the shaft seal from an oil-side of the shaft seal, comprising:
   an annular mounting portion;
   a seal lip having an annular inner sealing surface extending between an oil-side end and a free air-side end, said inner sealing surface being configured to extend axially along the shaft in sealed engagement therewith;
   an annular bridge connected to said oil-side end of said seal lip and to said mounting portion, said bridge extending in radially overlying relation to said seal lip; and
   a rigid, substantially planar annular disc extending radially inwardly from an outermost periphery that is fixed to said mounting portion to an innermost periphery that faces the shaft on the air-side of said seal lip, said innermost periphery having an inner diameter greater than the diameter of said inner sealing surface of said seal lip to remain out of contact with the shaft, said disc being spaced axially from said seal lip and entirely out of contact with said seal lip when said seal lip is in an unbiased, relaxed state and upon being installed on the shaft, said seal lip initially contacting said disc when said seal lip is moved axially toward the air-side of said radial shaft seal during installation to prevent said seal lip from being rolled and inverted axially toward the air-side of said radial shaft seal during installation.

2. The radial shaft seal of claim 1 wherein said innermost periphery of said disc has a plurality of radially inwardly extending projections.

3. The radial shaft seal of claim 2 wherein said plurality of projections are spaced circumferentially equidistant from one another.

4. A radial shaft seal assembly, comprising:
   a shaft extending along a central axis and providing a running surface with a predetermined diameter; and
   a radial shaft seal configured for receipt in a housing and about said shaft to sealingly isolate an air-side of the radial shaft seal from an oil-side of the radial shaft seal, comprising:
   an annular mounting portion;
   a seal lip having an annular inner sealing surface extending between an oil-side end and a free air-side end, said inner sealing surface being configured to extend axially along said running surface of said shaft in sealed engagement therewith;
   an annular bridge connected to said oil-side end of said seal lip and to said mounting portion, said bridge extending in radially overlying relation to said seal lip; and
   a rigid, substantially planar annular disc extending radially inwardly from an outermost periphery that is fixed to said mounting portion to an innermost periphery that faces said shaft on the air-side of said seal lip, said innermost periphery having an inner diameter greater than the inner diameter of said inner sealing surface to remain out of contact with the shaft, said disc being spaced axially from said seal lip and entirely out of contact with said seal lip when said seal lip is in an unbiased, relaxed state and upon being installed on said shaft, said seal lip initially contacting said disc when said seal lip is moved axially toward the air-side of said radial shaft seal assembly during installation to prevent said seal lip from being rolled and inverted axially toward the air-side of said radial shaft seal assembly.

5. The radial shaft seal assembly of claim 4 wherein said innermost periphery of said disc has a plurality of radially inwardly extending projections.

6. The radial shaft seal assembly of claim 5 wherein said plurality of projections are spaced circumferentially equidistant from one another.

7. A method of installing a radial shaft seal onto a shaft, comprising:
   providing a shaft having a running surface;
   providing the radial shaft seal with a seal lip having an annular sealing surface converging from an oil side end to a free air side end while in a free state with an annular bridge attached to the oil side end by a first hinge and diverging to a second hinge while in the free state, the second hinge being attached to an outer annular mounting portion such that the bridge extends in radially overlying relation with the seal lip, the seal further including an annular, substantially planar disc extending radially inwardly from the mounting portion in axially spaced relation from the seal lip, the disc having an oil side facing the seal lip in spaced relation therefrom;
   moving the shaft and the radial shaft seal axially toward one another;
   bringing the oil side end of the seal lip into abutment with an end of the shaft and causing the air-side end of the seal lip to move into abutment with the oil side of the disc; and
   bringing the sealing surface into sealing engagement with the running surface and simultaneously causing the air side end of the seal lip to move out of abutment with the projection.

* * * * *